(12) United States Patent
Yamamoto

(10) Patent No.: US 9,834,733 B2
(45) Date of Patent: Dec. 5, 2017

(54) CHAR REMOVAL PIPE

(71) Applicant: MITSUBISHI HEAVY INDUSTRIES, LTD., Tokyo (JP)

(72) Inventor: Takashi Yamamoto, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 14/650,377

(22) PCT Filed: Dec. 6, 2013

(86) PCT No.: PCT/JP2013/082881
§ 371 (c)(1),
(2) Date: Jun. 8, 2015

(87) PCT Pub. No.: WO2014/103668
PCT Pub. Date: Jul. 3, 2014

(65) Prior Publication Data
US 2015/0299591 A1 Oct. 22, 2015

(30) Foreign Application Priority Data

Dec. 27, 2012 (JP) ................................ 2012-285059

(51) Int. Cl.
*B65G 53/18* (2006.01)
*C10K 1/02* (2006.01)
(Continued)

(52) U.S. Cl.
CPC ................ *C10K 1/02* (2013.01); *B65G 53/20* (2013.01); *B65G 65/32* (2013.01); *C10J 3/506* (2013.01);
(Continued)

(58) Field of Classification Search
CPC ......... B65G 53/18; B65G 53/20; B65G 53/22
(Continued)

(56) References Cited

U.S. PATENT DOCUMENTS 2,866,272 A * 12/1958 Pedersen ............... F27B 7/2025
34/583
2,868,590 A * 1/1959 Allen ..................... B65G 53/58
406/144
(Continued)

FOREIGN PATENT DOCUMENTS

CN 1309641 4/2007
CN 102795478 11/2012
(Continued)

OTHER PUBLICATIONS

A Decision of Patent Grant dated Dec. 8, 2015 in corresponding Japanese patent application No. 2012-285059 (with English translation).
(Continued)

*Primary Examiner* — Joseph Dillon, Jr.
(74) *Attorney, Agent, or Firm* — Wenderoth, Lind & Ponack, L.L.P.

(57) ABSTRACT

A char removal pipe including a removal pipe (22), a perforated plate (26) that partitions the interior of the removal pipe (22) into a powder channel (29) and a gas chamber (30), and an assist gas supplying device (28) that supplies an assist gas to the gas chamber (30). The perforated plate (26) is formed so that the pressure loss when the assist gas flows from the gas chamber (30) to the powder channel (29) through the perforated plate (26) is greater than the pressure loss when the assist gas flows through accumulated powder formed by the accumulation, on the perforated plate (26), of powder flowing in the powder channel (29).

5 Claims, 5 Drawing Sheets

(51) Int. Cl.
  *B65G 53/20*   (2006.01)
  *C10J 3/50*    (2006.01)
  *B65G 65/32*   (2006.01)

(52) U.S. Cl.
  CPC .. *C10J 2300/094* (2013.01); *C10J 2300/1653* (2013.01); *Y02E 20/18* (2013.01)

(58) Field of Classification Search
  USPC ............... 406/88, 93, 94, 95; 414/208, 676
  See application file for complete search history.

(56) References Cited

U.S. PATENT DOCUMENTS

| | | | | |
|---|---|---|---|---|
| 2,874,999 | A * | 2/1959 | Lofgren | B65G 53/20 406/120 |
| 3,056,632 | A * | 10/1962 | Isler | B65G 53/20 406/52 |
| 3,863,577 | A * | 2/1975 | Steever | B01J 8/24 110/245 |
| 3,929,379 | A * | 12/1975 | Krambrock | B65G 53/525 406/95 |
| 4,052,172 | A * | 10/1977 | Shirakawa | B01J 8/28 201/31 |
| 4,183,702 | A * | 1/1980 | Bonnel | B65G 53/18 406/144 |
| 5,003,931 | A * | 4/1991 | Huschauer | F22B 31/0084 110/186 |
| 5,044,287 | A * | 9/1991 | Furukawa | F23C 9/003 110/188 |
| 5,078,100 | A * | 1/1992 | Huschauer | F22B 31/0084 110/190 |
| 5,524,768 | A * | 6/1996 | de Silva | B03B 4/00 209/235 |
| 5,682,828 | A * | 11/1997 | Phalen | F23C 10/10 110/245 |
| 6,418,866 | B1 * | 7/2002 | Shimizu | F23C 10/28 110/188 |
| 6,436,158 | B1 * | 8/2002 | Fujikawa | C10L 9/06 44/592 |
| 6,666,629 | B2 * | 12/2003 | Hirsch | B01J 8/0025 406/194 |
| 6,719,500 | B2 * | 4/2004 | Pfeiffer | B65G 53/58 406/91 |
| 6,764,253 | B1 * | 7/2004 | Pfeiffer | B65G 53/521 406/11 |
| 6,923,128 | B2 * | 8/2005 | Seeber | C10J 3/482 110/245 |
| 7,144,204 | B2 * | 12/2006 | Hilgraf | B65G 53/521 406/128 |
| 7,329,071 | B2 * | 2/2008 | Sonnichsen | B65G 53/521 406/144 |
| 7,875,249 | B2 * | 1/2011 | Murakami | B01J 8/0015 110/245 |
| 8,464,860 | B2 * | 6/2013 | Frey | B65G 53/4633 198/642 |
| 8,480,336 | B2 * | 7/2013 | Krebs | B65G 53/08 406/53 |
| 8,764,350 | B2 * | 7/2014 | Bjarno | B65G 53/20 406/173 |
| 9,557,115 | B2 * | 1/2017 | Jukkola | F28C 3/14 |
| 9,617,087 | B2 * | 4/2017 | Jukkola | B65G 53/16 |
| 2004/0191007 | A1 * | 9/2004 | Karlsen | C25C 3/14 406/90 |
| 2005/0042041 | A1 * | 2/2005 | Hilgraf | B65G 53/521 406/92 |
| 2009/0269149 | A1 * | 10/2009 | Hilgraf | B65G 53/28 406/155 |
| 2009/0304464 | A1 * | 12/2009 | Bjarno | B65G 53/20 406/168 |
| 2013/0087084 | A1 * | 4/2013 | Sato | F23G 5/085 110/218 |
| 2013/0140168 | A1 | 6/2013 | Koyama et al. | |
| 2013/0180362 | A1 * | 7/2013 | Kamikawa | C21B 11/00 75/392 |
| 2014/0231239 | A1 * | 8/2014 | Koyama | B65G 53/18 202/261 |
| 2015/0175890 | A1 * | 6/2015 | Nakagawa | C10B 57/005 202/136 |
| 2015/0239684 | A1 * | 8/2015 | Soda | B65G 53/20 414/293 |
| 2015/0291372 | A1 * | 10/2015 | Brockway | B65G 53/16 406/93 |

FOREIGN PATENT DOCUMENTS

| | | |
|---|---|---|
| JP | 58-123825 | 8/1983 |
| JP | 61-12790 | 1/1986 |
| JP | 61-18633 | 1/1986 |
| JP | 61-98732 | 6/1986 |
| JP | 1-58533 | 4/1989 |
| JP | 2-206687 | 8/1990 |
| JP | 8-12075 | 1/1996 |
| JP | 11-108742 | 4/1999 |
| JP | 3054788 | 6/2000 |
| JP | 2007-153585 | 6/2007 |
| JP | 2008-230825 | 10/2008 |
| JP | 2010-091193 | 4/2010 |
| JP | 2012-126571 | 7/2012 |
| JP | 2013-170185 | 9/2013 |

OTHER PUBLICATIONS

International Search Report dated Mar. 11, 2014 in International Application No. PCT/JP2013/082881.
Written Opinion of the International Searching Authority dated Mar. 11, 2014 in International Application No. PCT/JP2013/082881.
Office Action dated Feb. 1, 2016 in corresponding Chinese patent application No. 201380066669.4 (with English translation).
Notification of Grant of Invention Patent dated May 24, 2016 in Chinese patent application No. 201380066669.4 (with English translation).
Notice of Allowance dated Feb. 14, 2017 in corresponding Korean patent application No. 10-2015-7016215.

* cited by examiner

CHAR REMOVAL PIPE

BACKGROUND OF THE INVENTION

1. Technical Field

The present invention relates to a char removal pipe and particularly, to a char removal pipe which delivers powder.

2. Description of the Related Art

A coal gasification combined power generation facility is known. The coal gasification combined power generation facility is provided with a coal gasification furnace, a char recovery device, gas purification equipment, gas turbine equipment, an exhaust heat recovery boiler, steam turbine equipment, and a power generator. The coal gasification furnace gasifies pulverized coal, thereby producing a producer gas having combustibility. In the producer gas, char or the like is mixed with a combustible gas.

The char recovery device removes the char from the producer gas, thereby producing a char-free producer gas. The gas purification equipment purifies the char-free producer gas, thereby producing a purified producer gas. The gas turbine equipment burns the purified producer gas, thereby producing a high-temperature and high-pressure combustion gas and generating rotational power. The exhaust heat recovery boiler recovers thermal energy from the combustion gas and produces high-pressure steam. The steam turbine equipment generates rotational power by using the steam. The power generator converts the rotational power generated by the gas turbine equipment and the steam turbine equipment into electric power.

The char recovery device is provided with a char recovery device main body, a removal pipe for char discharge, a char bin, a removal pipe for char supply, and a char supply hopper. The char recovery device main body separates char from the producer gas. The removal pipe for char discharge forms a powder channel connecting the char recovery device main body and the char bin and transports the char from the char recovery device main body to the char bin by using the force of gravity. The char bin stores the char. The removal pipe for char supply forms a powder channel connecting the char bin and the char supply hopper and transports the char from the char bin to the char supply hopper by using the force of gravity. The char supply hopper intermittently supplies the char to the gasification furnace in predetermined amounts.

In order to increase treatment capacity, there is a case where the char recovery device is provided with a plurality of char recovery device main bodies or provided with a plurality of char supply hoppers. In this case, the plurality of char recovery device main bodies are disposed side by side in a horizontal direction, and the plurality of char supply hoppers are disposed side by side in the horizontal direction. For this reason, there is a case where the removal pipe for char discharge or the removal pipe for char supply is disposed along a straight line inclined from a vertical direction by a predetermined inclination angle.

If the removal pipe for char discharge or the removal pipe for char supply is disposed with an inclination close to the horizontal, there is a concern that the char may be accumulated in the pipe. In a char removal pipe, it is desired to more appropriately transport powder, and even when it is disposed along a gentle slope, it is desired to appropriately transport powder.

Japanese Unexamined Patent Application Publication No. 2012-126571 discloses a bin system which assists in the flow of char in a char discharge line by injecting an assist gas along the lower surface of the inner circumference of the char discharge line.

SUMMARY OF THE INVENTION

1. Technical Problem

However, in the bin system disclosed in PTL 1, when there is unevenness in the rate of accumulation of the char which is accumulated on the lower surface of the inner circumference, the char does not appropriately flow, and thus there is a case where the char cannot be appropriately transported.

An object of the present invention is to provide a char removal pipe which more appropriately transports powder.

2. Solution to the Problem

According to an aspect of the present invention, there is provided a char removal pipe including: a removal pipe; a perforated plate that partitions the interior of the removal pipe into a powder channel and a gas chamber; and an assist gas supplying device that supplies an assist gas to the gas chamber. The perforated plate is formed such that a pressure loss when the assist gas flows from the gas chamber to the powder channel through the perforated plate is greater than a calculated pressure loss calculated based on a pressure loss when the assist gas flows through accumulated powder that is formed due to powder flowing through the powder channel being accumulated on the perforated plate.

In such a char removal pipe, when a pressure loss in the perforated plate is sufficiently large, even in a case where there is unevenness in the rate of accumulation of powder which is accumulated on the perforated plate, it is possible to more uniformly eject the assist gas from the perforated plate to the powder channel and it is possible to reduce a frictional force between the powder and the perforated plate, and thus it is possible to more appropriately transport the powder.

The perforated plate is formed of perforated metal that is formed from a plate in which holes are formed.

In such a perforated plate, by increasing or decreasing the number of holes or by changing the diameter of the hole, it is possible to more easily change a pressure loss in the perforated plate. For this reason, a char removal pipe with such a perforated plate applied thereto can be more easily fabricated.

The perforated plate is formed of a plurality of portions. A pressure loss in a first portion among the plurality of portions is different from a pressure loss in a second portion different from the first portion among the plurality of portions.

In such a char removal pipe, it is possible to eject the assist gas at a more appropriate pressure for each of the plurality of portions. For this reason, in such a char removal pipe, when a predetermined distribution is formed in an amount of the accumulated powder, by ejecting the assist gas at a more appropriate pressure for each of the plurality of portions, it is possible to more appropriately transport the powder.

The gas chamber is provided with a plurality of gas chambers corresponding to the plurality of portions. In this case, the assist gas supplying device supplies the assist gas to the plurality of gas chambers such that gas pressure of a first gas chamber corresponding to the first portion among the plurality of gas chambers is different from gas pressure of a second gas chamber corresponding to the second portion among the plurality of gas chambers.

In such a char removal pipe, it is possible to eject the assist gas at a more appropriate pressure for each of the plurality of portions. For this reason, in such a char removal pipe, when a predetermined distribution is formed in an amount of the accumulated powder, by ejecting the assist gas at a more appropriate pressure for each of the plurality of portions, it is possible to more appropriately transport the powder.

The assist gas supplying device is formed such that a flow rate at which the assist gas is ejected from an upstream-side portion among the plurality of portions is greater than a flow rate at which the assist gas is ejected from a downstream-side portion that is disposed further toward a downstream side of the powder channel than the upstream-side portion among the plurality of portions.

The powder is more easily accumulated on the upstream-side portion than the downstream-side portion. For this reason, in such a char removal pipe, it is possible to eject more of the assist gas from the upstream-side portion, and thus it is possible to more appropriately transport the powder.

According to another aspect of the present invention, there is provided a char recovery device including: the char removal pipe according to the above aspect of the present invention; a char recovery device main body that separates char from a producer gas that is produced when gasifying coal; and a char bin that stores the char. The char removal pipe is provided such that the char is transported from the char recovery device main body to the char bin through the powder channel.

In such a char recovery device, the char removal pipe can more appropriately transport the char, whereby even in a case where a plurality of the char recovery device main bodies are provided, an increase in the size of the char recovery device can be prevented. That is, it is preferable that such a char removal pipe is applied to the transportation of the char from the char recovery device main body to the char bin.

According to still another aspect of the present invention, there is provided a char recovery device including: the char removal pipe according to the above aspect of the present invention; a char bin that stores char that is separated from a producer gas that is produced by a gasification furnace for gasifying coal; and a char supply hopper that supplies the char to the gasification furnace. The char removal pipe is provided such that the char is transported from the char bin to the char supply hopper through the powder channel.

In such a char recovery device, the char removal pipe can more appropriately transport the char, whereby even in a case where a plurality of the char supply hoppers are provided, an increase in the size of the char recovery device can be prevented. That is, it is preferable that such a char removal pipe is applied to the transportation of the char from the char bin to the char supply hopper.

3. Advantageous Effects of the Invention

In the char removal pipe according to the present invention, even in a case where there is unevenness in the rate of accumulation of powder which is accumulated on a porous body, it is possible to more uniformly eject the assist gas from the porous body to the powder channel, and thus it is possible to more appropriately transport the powder.

DETAILED DESCRIPTION OF THE EMBODIMENTS

Figure 1:
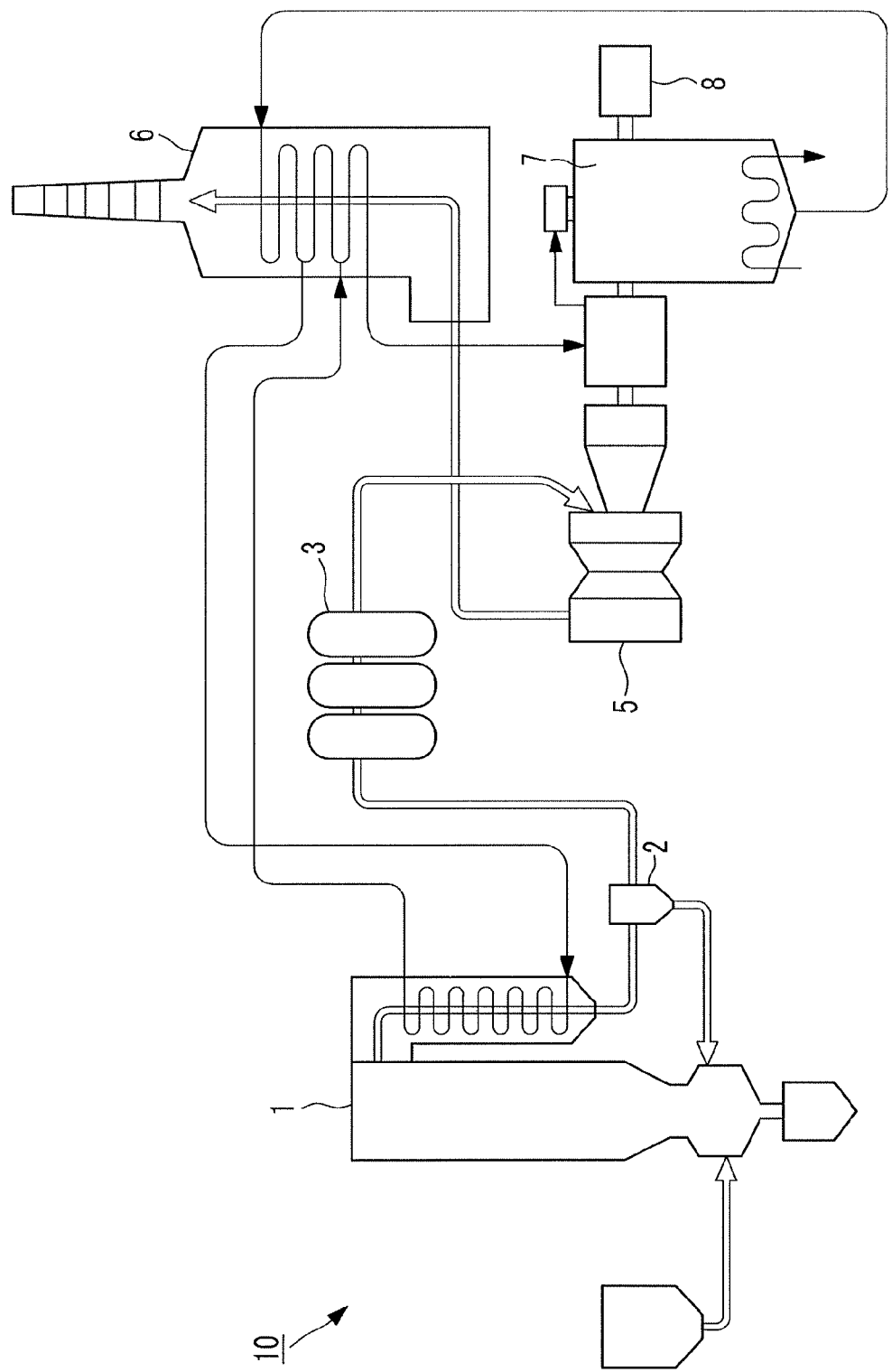
FIG. 1 is a schematic configuration diagram showing a coal gasification combined power generation facility to which a char removal pipe according to the present invention is applied.

Hereinafter, an embodiment of a char removal pipe according to the present invention will be described with reference to the drawings. The char removal pipe is applied to a coal gasification combined power generation facility. A coal gasification combined power generation facility 10 is provided with a coal gasification furnace 1, a char recovery device 2, gas purification equipment 3, gas turbine equipment 5, an exhaust heat recovery boiler 6, steam turbine equipment 7, and a power generator 8, as shown in FIG. 1. The coal gasification furnace 1 gasifies pulverized coal, thereby producing a producer gas having combustibility. In the producer gas, char or the like is mixed with a combustible gas.

The char recovery device 2 removes the char from the producer gas, thereby producing a char-free producer gas. The gas purification equipment 3 purifies the char-free producer gas, thereby producing a purified producer gas. The gas turbine equipment 5 burns the purified producer gas, thereby producing a high-temperature and high-pressure combustion gas and generating rotational power. The exhaust heat recovery boiler 6 recovers thermal energy from the combustion gas and produces high-pressure steam. The steam turbine equipment 7 generates rotational power by using the steam. The power generator 8 converts the rotational power generated by the gas turbine equipment 5 and the steam turbine equipment 7 into electric power.

Figure 2:
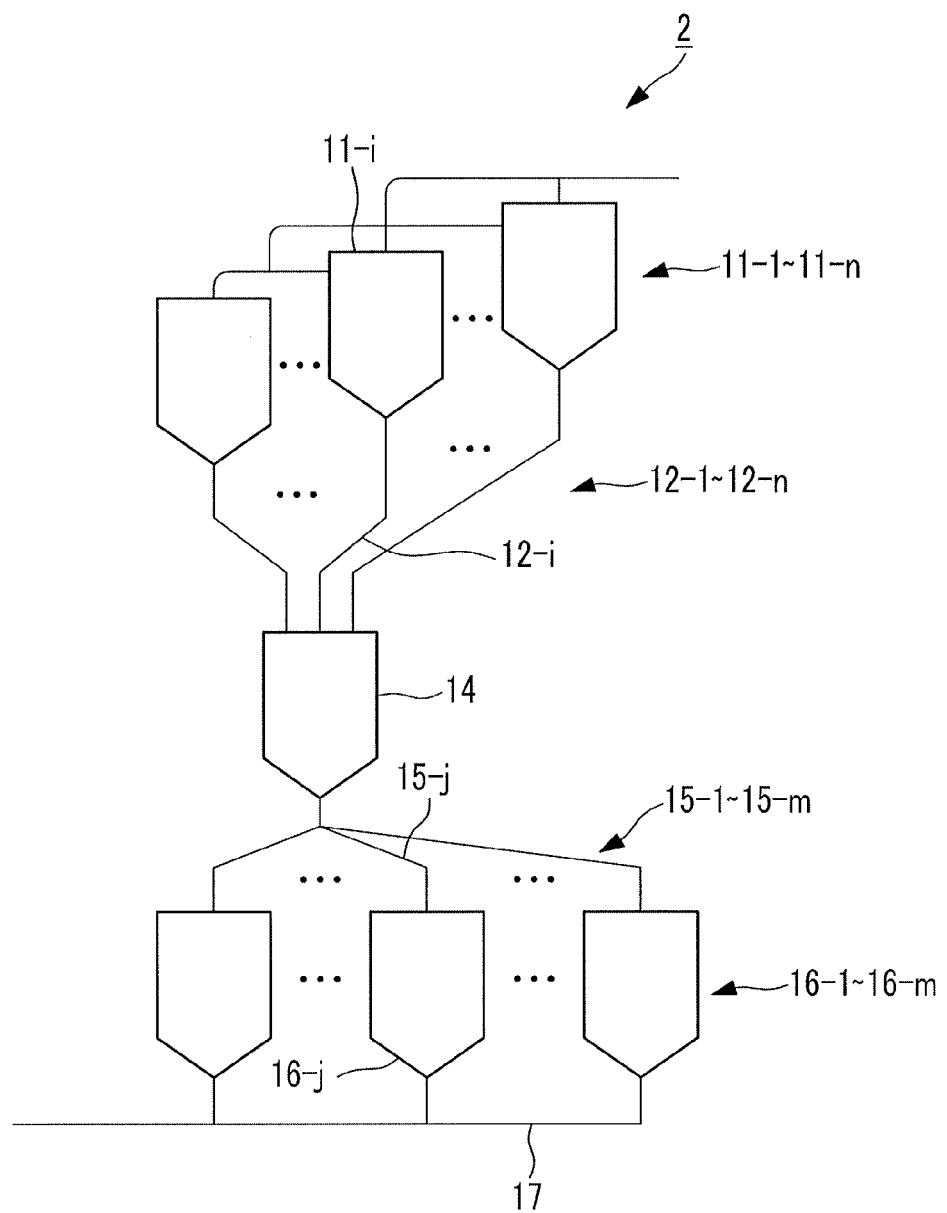
FIG. 2 is a schematic configuration diagram showing a char recovery device to which the char removal pipe according to the present invention is applied.

FIG. 2 shows the char recovery device 2. The char recovery device 2 is provided with a plurality of char recovery device main bodies 11-1 to 11-$n$ (n=2, 3, 4, . . . ), a plurality of removal pipes for char discharge 12-1 to 12-$n$, a char bin 14, a plurality of removal pipes for char supply 15-1 to 15-$m$ (m=2, 3, 4, . . . ), a plurality of char supply hoppers 16-1 to 16-$m$, and a char return line 17.

Each of the plurality of char recovery device main bodies 11-1 to 11-$n$ is formed of a dust collector for removing solid particulates from gas. As the dust collector, a cyclone, a porous filter, an electrical dust collector, or a granular bed may be exemplified. An arbitrary char recovery device main body 11-$i$ (i=1, 2, 3, . . . , or n) of the plurality of char recovery device main bodies 11-1 to 11-$n$ separates the producer gas produced by the coal gasification furnace 1 into an i-th char-free producer gas and powder. Otherwise, the char recovery device main body 11-$i$ separates an (i−1)-th char-free producer gas separated by another char recovery device main body 11-(*i*−1) different from the char recovery device main body 11-*i* among the plurality of char recovery device main bodies 11-1 to 11-*n* into the i-th char-free producer gas and powder. The char-free producer gas which is produced by the char recovery device 2 is formed from any of the plurality of char-free producer gases which are respectively separated by the plurality of char recovery device main bodies 11-1 to 11-*n* and contains an n-th char-free producer gas separated by, for example, the char recovery device main body 11-*n*. The powder is formed from solid particulates and contains char which did not react in the coal gasification furnace 1, of the pulverized coal.

The plurality of removal pipes for char discharge 12-1 to 12-*n* correspond to the plurality of char recovery device main bodies 11-1 to 11-*n*. A removal pipe for char discharge 12-*i* corresponding to the char recovery device main body 11-*i* among the plurality of removal pipes for char discharge 12-1 to 12-*n* forms a flow path which transports the powder from the char recovery device main body 11-*i* to the char bin 14.

The char bin 14 stores the powder which is supplied from the plurality of char recovery device main bodies 11-1 to 11-*n* through the plurality of removal pipes for char discharge 12-1 to 12-*n*. The plurality of removal pipes for char supply 15-1 to 15-*m* correspond to the plurality of char supply hoppers 16-1 to 16-*m*. An arbitrary removal pipe for char supply 15-*j* (j=1, 2, 3, or m) of the plurality of removal pipes for char supply 15-1 to 15-*m* forms a flow path which transports the powder from the char bin 14 to a char supply hopper 16-*j* corresponding to the removal pipe for char supply 15-*j* among the plurality of char supply hoppers 16-1 to 16-*m*.

The char return line 17 forms a flow path which transports the powder from the plurality of char supply hoppers 16-1 to 16-*m* to the coal gasification furnace 1. The char supply hopper 16-*j* intermittently supplies the powder to the coal gasification furnace 1 through the char return line 17 such that the powder stored by the char bin is supplied to the coal gasification furnace 1 in a predetermined amount per unit time.

Figure 3:
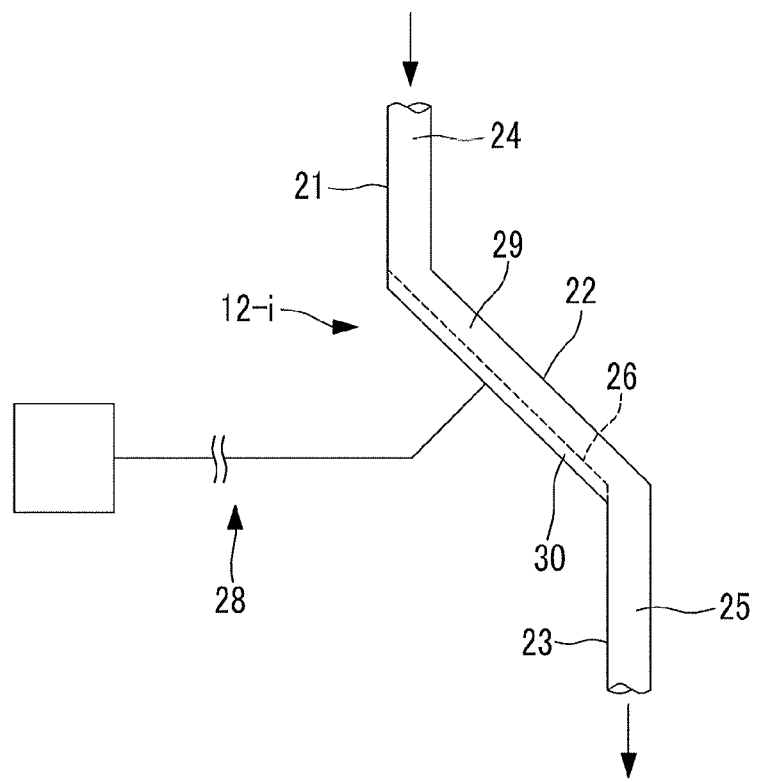
FIG. 3 is a side view showing the char removal pipe according to the present invention.

FIG. 3 shows the removal pipe for char discharge 12-*i*. The removal pipe for char discharge 12-*i* includes upstream-side vertically downward piping 21, inclined piping 22, and downstream-side vertically downward piping 23. The upstream-side vertically downward piping 21 is formed of a pipe which forms a vertically downward flow path 24. The upstream-side vertically downward piping 21 is disposed along a vertical line which is parallel to a vertical direction, and disposed such that the surface of an inner wall facing the vertically downward flow path 24 is substantially parallel to the vertical direction. The inclined piping 22 is formed of a pipe. The inclined piping 22 is disposed on the vertically lower side (the downstream side) of the upstream-side vertically downward piping 21 and disposed obliquely along a straight line which is not parallel to the vertical direction. In addition, the inclined piping 22 is disposed such that a position at which an end on the upstream side of the inclined piping 22 is orthographically projected to a vertical line is disposed further toward the vertically upper side than a position at which an end on the downstream side of the inclined piping 22 is orthographically projected to the vertical line. The downstream-side vertically downward piping 23 is formed of a pipe which forms a vertically downward flow path 25. The downstream-side vertically downward piping 23 is disposed on the vertically lower side (the downstream side) of the inclined piping 22. In addition, the downstream-side vertically downward piping 23 is disposed along a straight line which is parallel to the vertical direction, and disposed such that the surface of an inner wall facing the vertically downward flow path 25 is substantially parallel to the vertical direction.

The removal pipe for char discharge 12-*i* is further provided with a perforated plate 26 and an assist gas supplying device 28. The perforated plate 26 is so-called perforated metal and is formed of a flat metal plate in which a plurality of holes are formed. Each of the plurality of holes is small to the extent that particulates mixed with the producer gas do not pass therethrough. In addition, the perforated plate 26 is formed such that a pressure loss per unit area when an assist gas passes therethrough is uniform with respect to a position. That is, the perforated plate 26 is formed such that, when the perforated plate 26 is separated into a plurality of areas, a plurality of pressure losses corresponding to the plurality of areas are substantially equal to each other. A pressure loss corresponding to a certain area among the plurality of pressure losses is equal to a pressure loss per unit area of the area when an assist gas passes through the area. The perforated plate 26 is formed of perforated metal, thereby being able to be easily formed so as to have a desired pressure loss. That is, in the perforated plate 26, the pressure loss can be easily changed by changing the diameters of the plurality of holes or changing the density of the plurality of holes.

The perforated plate 26 is disposed inside the inclined piping 22 so as to separate the inside of the inclined piping 22 into an inclined channel 29 and a gas chamber 30. In addition, the perforated plate 26 is disposed such that, when powder flows through the inclined channel 29, the powder is accumulated on the perforated plate 26. That is, the perforated plate 26 is disposed such that an area intersecting the inclined channel 29 of an arbitrary vertical line is disposed further toward the vertically upper side than an area intersecting the gas chamber 30 of the vertical line, and such that the perforated plate 26 is disposed substantially parallel to a straight line which the inclined piping 22 follows, and such that a line of intersection at which the perforated plate 26 and a horizontal plane intersect is perpendicular to the straight line. In addition, the inclined piping 22 is joined to the upstream-side vertically downward piping 21 such that the inclined channel 29 is connected to the vertically downward flow path 24 of the upstream-side vertically downward piping 21. In addition, the inclined piping 22 is joined to the downstream-side vertically downward piping 23 such that the inclined channel 29 is connected to the vertically downward flow path 25 of the downstream-side vertically downward piping 23.

The assist gas supplying device 28 supplies an assist gas to the gas chamber 30 such that the gas pressure of the gas chamber 30 reaches a predetermined pressure. As the assist gas, nitrogen gas, carbon dioxide gas, inert gas having an oxygen concentration of 3% or less, or a combustible gas may be exemplified. As the combustible gas, the char-free producer gas which is produced by the char recovery device 2 or the purified producer gas which is produced by the gas purification equipment 3 may be exemplified.

The removal pipe for char supply 15-*j* is formed in the same manner as the removal pipe for char discharge 12-*i*. That is, the removal pipe for char supply 15-*j* includes the upstream-side vertically downward piping 21, the inclined piping 22, and the downstream-side vertically downward piping 23 and is provided with the perforated plate 26 and the assist gas supplying device 28.

Figure 4:
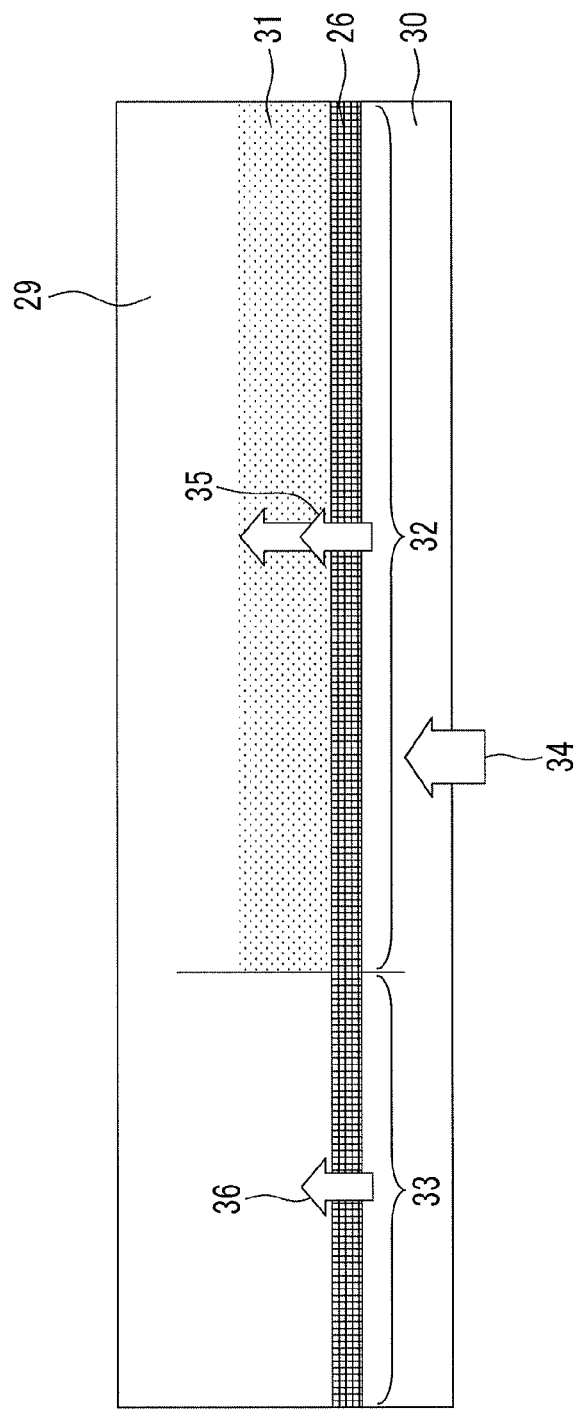
FIG. 4 is a graph showing a pressure loss when an assist gas flows through a porous body on which powder is accumulated and a pressure loss when an assist gas flows through a porous body on which powder is not accumulated.

FIG. 4 shows the flow rate of an assist gas which passes through the perforated plate 26 when powder has been accumulated on the perforated plate 26. Powder 31 is accumulated on a powder accumulation portion 32 of the perforated plate 26. That is, the powder 31 is not accumulated on a powder non-accumulation portion 33 separate from the powder accumulation portion 32 of the perforated plate 26. At this time, an assist gas 35 which has passed through the powder accumulation portion 32 is supplied to the inclined channel 29 by passing through the powder 31. An assist gas 36 which has passed through the powder non-accumulation portion 33 is supplied to the inclined channel 29 without passing through the powder 31. For this reason, a flow rate G1 of the assist gas 35 having passed through the powder accumulation portion 32 is equal to the flow rate of an assist gas 35 which passes through the powder 31. In addition, a flow rate G of the assist gas 34 supplied to the gas chamber 30 is equal to the sum of the flow rate G1 of the assist gas having passed through the powder accumulation portion 32 and a flow rate G2 of the assist gas having passed through the powder non-accumulation portion 33.

A pressure loss $\Delta P1'$ per unit area when the assist gas passes through the powder accumulation portion 32 is equal to a pressure loss $\Delta P2'$ per unit area when the assist gas passes through the powder non-accumulation portion 33. A pressure loss per unit area when the assist gas passes through both the powder accumulation portion 32 and the powder 31 is substantially equal to the sum ($\Delta P1'+\Delta P1''$) of the pressure loss $\Delta P1'$ per unit area when the assist gas passes through the powder accumulation portion 32 and a pressure loss $\Delta P1''$ in the powder 31. At this time, the pressure loss $\Delta P1''$ in the powder 31 indicates a pressure loss per unit area when the assist gas passes through the powder 31 when the powder 31 has been accumulated to a predetermined height. The predetermined height indicates the maximum value of a height to which the powder 31 is accumulated on the perforated plate 26 when the powder 31 is supplied to the inclined channel 29. For this reason, the flow rate per unit area of the assist gas which passes through the powder accumulation portion 32 and the flow rate per unit area of the assist gas which passes through the powder non-accumulation portion 33 are determined by the pressure loss $\Delta P1'$ per unit area when the assist gas passes through the powder accumulation portion 32, the pressure loss $\Delta P2'$ per unit area when the assist gas passes through the powder non-accumulation portion 33, and the pressure loss $\Delta P1''$ per unit area when the assist gas passes through the powder 31. That is, when the pressure loss ($\Delta P1'+\Delta P1''$) per unit area when the assist gas passes through the powder accumulation portion 32 and the powder 31 is greater than the pressure loss $\Delta P2'$, the flow rate per unit area of the assist gas which passes through the powder non-accumulation portion 33 becomes greater than the flow rate per unit area of the assist gas which passes through the powder accumulation portion 32. In addition, when the quotient of the pressure loss ($\Delta P1'+\Delta P1''$) per unit area when the assist gas passes through the powder accumulation portion 32 and the powder 31 divided by the pressure loss $\Delta P2'$ is greater than 1, the flow rate per unit area of the assist gas which passes through the powder non-accumulation portion 33 becomes greater than the flow rate per unit area of the assist gas which passes through the powder accumulation portion 32.

The perforated plate 26 is formed such that the pressure loss $\Delta P1'$ (=$\Delta P2'$) in the perforated plate 26 is sufficiently greater than the pressure loss $\Delta P1''$ in the powder 31, that is, such that the pressure loss $\Delta P1'$ ($\Delta P2'$) is greater than a calculated pressure loss calculated based on the pressure loss $\Delta P1''$. As the calculated pressure loss, the pressure loss $\Delta P1''$ itself may be exemplified.

The coal gasification furnace 1 produces a producer gas by gasifying pulverized coal and supplies the producer gas to the char recovery device 2. If the producer gas is supplied to the char recovery device 2, the char recovery device main body 11-$i$ separates the producer gas into the i-th char-free producer gas and powder or separates the (i−1)-th char-free producer gas separated by another char recovery device main body 11-($i$−1) into the i-th char-free producer gas and powder. The char recovery device 2 produces a char-free producer gas by mixing any of a plurality of char-free producer gases which are respectively separated by the plurality of char recovery device main bodies 11-1 to 11-$n$, and supplies the char-free producer gas to the gas purification equipment 3. The char recovery device main body 11-$i$ supplies the separated powder to the removal pipe for char discharge 12-$i$.

The assist gas supplying device 28 supplies an assist gas to the gas chamber 30 of the removal pipe for char discharge 12-$i$ at a predetermined pressure when the char recovery device main body 11-$i$ is operating. In addition, the assist gas supplying device 28 supplies an assist gas to the gas chambers 30 of the removal pipes for char supply 15-$j$ at a predetermined pressure.

If the powder is supplied to the removal pipe for char discharge 12-$i$, first, the powder is supplied to the vertically downward flow path 24. If the powder is supplied to the vertically downward flow path 24, the powder falls due to the force of gravity, thereby moving vertically downward through the vertically downward flow path 24, and is supplied to the inclined channel 29. If the powder is supplied to the inclined channel 29, the powder is accumulated on the perforated plate 26. If an assist gas is supplied through the perforated plate 26, the powder is fluidized, thereby causing reduced friction with respect to the perforated plate 26, and thus flows over the perforated plate 26 due to the force of gravity. The powder flows over the perforated plate 26, thereby being supplied to the vertically downward flow path 25. If the powder is supplied to the vertically downward flow path 25, the powder falls due to the force of gravity, thereby moving vertically downward through the vertically downward flow path 25, and is supplied to the char bin 14.

If the powder is supplied from each of the plurality of removal pipes for char discharge 12-1 to 12-$n$ to the char bin 14, the char bin 14 temporarily stores the powder. The char bin 14 supplies the stored powder to the plurality of removal pipes for char supply 15-1 to 15-$m$.

If the powder is supplied to the removal pipe for char supply 15-$j$, first, the powder is supplied to the vertically downward flow path 24. If the powder is supplied to the vertically downward flow path 24, the powder falls due to the force of gravity, thereby moving vertically downward through the vertically downward flow path 24, and is supplied to the inclined channel 29. If the powder is supplied to the inclined channel 29, the powder is accumulated on the perforated plate 26. If an assist gas is supplied through the perforated plate 26, the powder is fluidized, thereby causing reduced friction with respect to the perforated plate 26, and thus flows over the perforated plate 26 due to the force of gravity. The powder flows over the perforated plate 26, thereby being supplied to the vertically downward flow path 25. If the powder is supplied to the vertically downward flow path 25, the powder falls due to the force of gravity, thereby moving vertically downward through the vertically downward flow path 25, and is supplied to the char supply hopper 16-$j$.

The char supply hopper 16-$j$ intermittently supplies the powder to the coal gasification furnace 1 through the char return line 17 such that the supplied powder is supplied to the coal gasification furnace 1 in a predetermined amount per unit time.

In the removal pipe for char discharge 12-$i$, even in a case where the perforated plate 26 includes the powder accumulation portion 32 on which the powder 31 is accumulated and the powder non-accumulation portion 33 on which the powder 31 is not accumulated, as shown in FIG. 4, due to the pressure loss in the perforated plate 26 being sufficiently greater than the pressure loss in the powder 31, it is possible to cause the assist gas to pass through the powder accumulation portion 32. For this reason, in the removal pipe for char discharge 12-$i$, it is possible to reduce the friction between the perforated plate 26 and the powder, and thus even in a case where the inclined channel 29 is more gently inclined, it is possible to cause the powder to smoothly flow in the inclined channel 29.

In the removal pipe for char supply 15-$j$, similar to the removal pipe for char discharge 12-$i$, due to the pressure loss in the perforated plate 26 being sufficiently greater than the pressure loss in the powder 31, even in a case where the inclined channel 29 is more gently inclined, it is possible to cause the powder to smoothly flow in the inclined channel 29.

As a result, in the char recovery device 2, the removal pipe for char discharge 12-$i$ or the removal pipe for char supply 15-$j$ is applied thereto, whereby it is possible to design the char recovery device 2 such that the inclined channel 29 is more gently inclined, and thus it is possible to reduce the size of the device and it is possible to reduce the manufacturing cost.

In addition, the perforated plate 26 can also be formed of other porous bodies different from the perforated metal. As the porous body, sintered metal may be exemplified. For example, in a perforated plate formed of sintered metal, it is possible to change a pressure loss therein by changing a plate thickness. In the char removal pipe according to the present invention, even in a case where such a porous body is applied to the perforated plate 26, similar to the removal pipe for char discharge 12-$i$ in the embodiment described above, even in a case where the inclined channel 29 is more gently inclined, it is possible to cause the powder to smoothly flow in the inclined channel 29.

In addition, in the char recovery device 2, one assist gas supplying device 28 need not be provided for each of the plurality of removal pipes for char discharge 12-1 to 12-$n$ and also a single assist gas supplying device may be provided with respect to the plurality of removal pipes for char discharge 12-1 to 12-$n$. In addition, in the char recovery device 2, one assist gas supplying device 28 need not be provided for each of the plurality of removal pipes for char supply 15-1 to 15-$m$ and also a single assist gas supplying device may be provided with respect to the plurality of removal pipes for char supply 15-1 to 15-$m$. In addition, in the char recovery device 2, a single assist gas supplying device may also be provided with respect to the plurality of removal pipes for char discharge 12-1 to 12-$n$ and the plurality of removal pipes for char supply 15-1 to 15-$m$. Also in such a char removal pipe, similar to the char recovery device 2 in the embodiment described above, it is possible to cause the powder to smoothly flow in the inclined channel 29, and thus, it is possible to design the char removal pipe such that the inclined channel 29 is more gently inclined.

Figure 5:
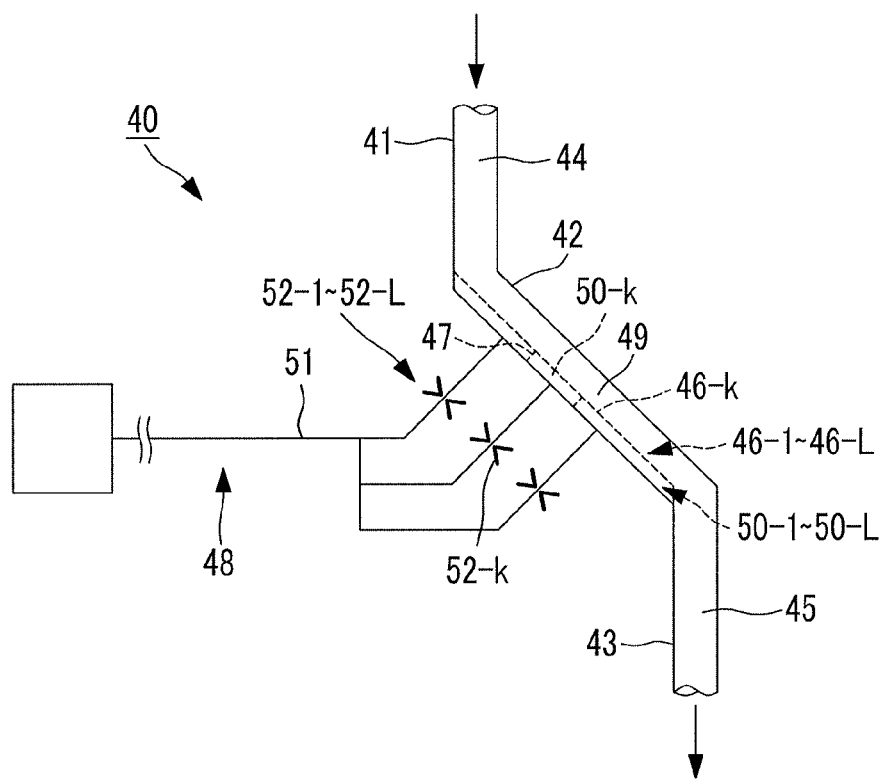
FIG. 5 is a side view showing a char removal pipe according to another embodiment.

FIG. 5 shows another embodiment of the char removal pipe according to the present invention. A char removal pipe 40 includes upstream-side vertically downward piping 41, inclined piping 42, and downstream-side vertically downward piping 43. The upstream-side vertically downward piping 41 is formed of a pipe which forms a vertically downward flow path 44. The upstream-side vertically downward piping 41 is disposed along a vertical line which is parallel to a vertical direction, and disposed such that the surface of an inner wall facing the vertically downward flow path 44 is substantially parallel to the vertical direction. The inclined piping 42 is formed of a pipe. The inclined piping 42 is disposed on the vertically lower side (the downstream side) of the upstream-side vertically downward piping 41 and disposed obliquely along a straight line which is not parallel to the vertical direction. In addition, the inclined piping 42 is disposed such that a position at which an end on the upstream side of the inclined piping 42 is orthographically projected to a vertical line is disposed further toward the vertically upper side than a position at which an end on the downstream side of the inclined piping 42 is orthographically projected to the vertical line. The downstream-side vertically downward piping 43 is formed of a pipe which forms a vertically downward flow path 45. The downstream-side vertically downward piping is disposed on the vertically lower side (the downstream side) of the inclined piping 42. In addition, the downstream-side vertically downward piping 43 is disposed along a straight line which is parallel to the vertical direction, and disposed such that the surface of an inner wall facing the vertically downward flow path 45 is substantially parallel to the vertical direction.

The char removal pipe 40 is provided with a plurality of perforated plates 46-1 to 46-L (L=2, 3, 4, . . . ), a plurality of partition plates 47, and an assist gas supplying device 48. An arbitrary perforated plate 46-$k$ ($k$=1, 2, 3, or L) among the plurality of perforated plates 46-1 to 46-L is formed of a flat metal plate in which a plurality of holes are formed. In addition, the perforated plate 46-$k$ is formed such that a pressure loss per unit area when an assist gas passes therethrough is uniform with respect to a position. In addition, the plurality of perforated plates 46-1 to 46-L are formed such that a pressure loss per unit area in the perforated plate 46-$k$ is different from a pressure loss per unit area in another perforated plate 46-($k$−1). The plurality of partition plates 47 are formed of a metal plate through which an assist gas does not pass.

In addition, the plurality of perforated plates 46-1 to 46-L is disposed such that, when powder flows through an inclined channel 49, the powder is accumulated on the plurality of perforated plates 46-1 to 46-L. The plurality of perforated plates 46-1 to 46-L and the plurality of partition plates 47 are disposed inside the inclined piping 42 so as to separate the inside of the inclined piping 42 into the inclined channel 49 and a plurality of gas chambers 50-1 to 50-L. The plurality of gas chambers 50-1 to 50-L correspond to the plurality of perforated plates 46-1 to 46-L. The perforated plate 46-$k$ corresponding to a gas chamber 50-$k$ among the plurality of perforated plates 46-1 to 46-L isolates the gas chamber 50-$k$ from the inclined channel 49. The plurality of partition plates 47 isolate an arbitrary gas chamber 50-$k$ among the plurality of gas chambers 50-1 to 50-L from another gas chamber 50-($k$−1) among the plurality of gas chambers 50-1 to 50-L.

In addition, the inclined piping 42 is joined to the upstream-side vertically downward piping 41 such that the inclined channel 49 is connected to the vertically downward flow path 44 of the upstream-side vertically downward piping 41. In addition, the inclined piping 42 is joined to the downstream-side vertically downward piping 43 such that the inclined channel 49 is connected to the vertically downward flow path 45 of the downstream-side vertically downward piping 43.

The assist gas supplying device 48 is provided with an assist gas flow path 51 and a plurality of orifices 52-1 to 52-L. An assist gas having a predetermined pressure is supplied to the assist gas flow path 51. The plurality of orifices 52-1 to 52-L correspond to the plurality of gas chambers 50-1 to 50-L. An orifice 52-$k$ corresponding to the gas chamber 50-$k$ among the plurality of orifices 52-1 to 52-L is provided between the assist gas flow path 51 and the gas chamber 50-$k$ and generates a difference in pressure between the assist gas flow path 51 and the gas chamber 50-$k$ such that an assist gas of a predetermined flow rate is supplied to the gas chamber 50-$k$. In addition, the plurality of orifices 52-1 to 52-L are formed such that the gas pressure of the gas chamber 50-$k$ is different from the gas pressure of another gas chamber 50-$(k-1)$.

In a char recovery device to which the char removal pipe 40 is applied, the removal pipe for char discharge 12-$i$ of the char recovery device 2 in the embodiment described above is substituted for the char removal pipe and the removal pipe for char supply 15-$j$ is substituted for the char removal pipe 40.

In the char removal pipe 40, similar to the removal pipe for char discharge 12-$i$ in the embodiment described above, it is possible to cause an assist gas to sufficiently pass through an area on which powder is accumulated, of the perforated plate 46-$k$, and thus even in a case where the inclined channel 49 is more gently inclined, it is possible to cause the powder to smoothly flow in the inclined channel 49. As a result, the char recovery device to which the char removal pipe 40 is applied can be designed such that the inclined channel 49 is more gently inclined, and thus it is possible to reduce the size of the device and it is possible to reduce the manufacturing cost.

The char removal pipe 40 can be formed such that the plurality of perforated plates 46-1 to 46-L and the plurality of orifices 52-1 to 52-L are appropriately formed, whereby a plurality of flow rates corresponding to the plurality of perforated plates 46-1 to 46-L are different from each other. The flow rate corresponding to the perforated plate 46-$k$ among the plurality of flow rates indicates a flow rate of passing through the perforated plate 46-$k$. In the char removal pipe 40, there is a case where the plurality of perforated plates 46-1 to 46-L include a perforated plate in which it is easy for the powder to be accumulated thereon when powder flows through the inclined channel 49, and a perforated plate in which it is hard for the powder to be accumulated thereon. In the char removal pipe 40, by forming the plurality of perforated plates 46-1 to 46-L and the plurality of orifices 52-1 to 52-L such that more assist gas passes through the perforated plate in which it is easy for the powder to be accumulated thereon, it is possible to cause powder to more efficiently flow in the inclined channel 49, as compared to the removal pipe for char discharge 12-$i$ in the embodiment described above. For example, in the char removal pipe 40, by forming the plurality of perforated plates 46-1 to 46-L and the plurality of orifices 52-1 to 52-L such that when it is easy for powder to be accumulated on the upstream side, the flow rate of the assist gas passing through the perforated plate on the upstream side among the plurality of perforated plates 46-1 to 46-L is greater than the flow rate of the assist gas passing through the perforated plate on the downstream side among the plurality of perforated plates 46-1 to 46-L, it is possible to cause the powder to efficiently flow in the inclined channel 49.

In addition, the assist gas supplying device 48 can also be replaced with another assist gas supplying device which supplies an assist gas to the plurality of gas chambers 50-1 to 50-L such that the gas pressures of the plurality of gas chambers 50-1 to 50-L are equal to each other. A char removal pipe with such an assist gas supplying device applied thereto can be formed such that the plurality of perforated plates 46-1 to 46-L are appropriately formed, whereby a plurality of flow rates corresponding to the plurality of perforated plates 46-1 to 46-L are different from each other. For this reason, in such a char removal pipe, similar to the char removal pipe 40 in the embodiment described above, it is possible to cause powder to efficiently flow in the inclined channel 49. In addition, in such a char removal pipe, it is also possible to omit the plurality of orifices 52-1 to 52-L and the plurality of partition plates 47, and thus the char removal pipe can be more easily fabricated, as compared to the char removal pipe 40 in the embodiment described above.

In addition, the plurality of perforated plates 46-1 to 46-L can be replaced with a plurality of other perforated plates in which pressure losses are equal to each other. A char removal pipe with the plurality of such perforated plates applied thereto can be formed such that the plurality of orifices 52-1 to 52-L are appropriately formed, whereby a plurality of flow rates corresponding to the plurality of perforated plates 46-1 to 46-L are different from each other. For this reason, in such a char removal pipe, similar to the char removal pipe 40 in the embodiment described above, it is possible to cause powder to efficiently flow in the inclined channel 49. In addition, in such a char removal pipe, the plurality of perforated plates can be easily fabricated, and thus the char removal pipe can be more easily fabricated, as compared to the char removal pipe 40 in the embodiment described above.

REFERENCE SIGNS LIST

22: INCLINED PIPING
26: PERFORATED PLATE
28: ASSIST GAS SUPPLYING DEVICE
29: INCLINED CHANNEL
30: GAS CHAMBER

The invention claimed is:

1. A char removal pipe comprising:
 a removal pipe including
  a first vertically oriented piping in which powder is supplied,
  an inclined piping which is connected to the first vertically oriented piping and through which the powder flows, and
  a second vertically oriented piping connected to the inclined piping to receive powder therefrom;
 a perforated plate disposed inside the inclined piping so as to partition the interior of the inclined piping into a powder channel and a gas chamber; and
 an assist gas supplying device that supplies an assist gas to the gas chamber,
 wherein an end on a downstream side of the first vertically oriented piping is joined to an end on an upstream side of the inclined piping, wherein an end on a downstream side of the inclined piping is joined to an end on an upstream side of the second vertically oriented piping, wherein the powder is transported from the end on the downstream side of the first vertically oriented piping to the end on the upstream side of the inclined piping due to a force of gravity, wherein accumulated powder is formed by accumulating the powder on the perforated plate during the powder flows by using the force of gravity and the assist gas from the end on the upstream side of the inclined piping to the end on the downstream side of the inclined piping, wherein the powder transported from the end on the downstream side of the inclined piping to the upstream side of the second vertically oriented piping is discharged from an end on a downstream side of the second vertically oriented piping by using the force of gravity, wherein the perforated plate is formed from a plate in which a plurality of holes are formed in a predetermined density, and wherein diameters of the holes and the density of the holes are set so that a pressure loss when the assist gas flows from the gas chamber to the powder channel through the perforated plate, in a state in which the accumulated powder is not formed, is greater than a pressure loss when the assist gas flows through accumulated powder that is formed at a maximum height due to powder flowing through the powder channel being accumulated on the perforated plate.

2. The char removal pipe according to claim 1, wherein the perforated plate is formed of perforated metal that is formed from a plate in which holes are formed.

3. The char removal pipe according to claim 1, wherein the perforated plate is formed of a plurality of portions, and a pressure loss in a first portion among the plurality of portions is different from a pressure loss in a second portion different from the first portion among the plurality of portions.

4. The char removal pipe according to claim 3, wherein the gas chamber is provided with a plurality of gas chambers corresponding to the plurality of portions, and the assist gas supplying device supplies the assist gas to the plurality of gas chambers such that gas pressure of a first gas chamber corresponding to the first portion among the plurality of gas chambers is different from gas pressure of a second gas chamber corresponding to the second portion among the plurality of gas chambers.

5. The char removal pipe according to claim 3, wherein the assist gas supplying device is formed such that a flow rate at which the assist gas is ejected from an upstream-side portion among the plurality of portions is greater than a flow rate at which the assist gas is ejected from a downstream-side portion that is disposed further toward a downstream side of the powder channel than the upstream-side portion among the plurality of portions.

* * * * *